United States Patent
Uemura

(10) Patent No.: US 12,128,711 B2
(45) Date of Patent: Oct. 29, 2024

(54) PNEUMATIC TIRE

(71) Applicant: BRIDGESTONE CORPORATION, Tokyo (JP)

(72) Inventor: Kazuki Uemura, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 408 days.

(21) Appl. No.: 17/596,284

(22) PCT Filed: Dec. 12, 2019

(86) PCT No.: PCT/JP2019/048755
§ 371 (c)(1),
(2) Date: Dec. 7, 2021

(87) PCT Pub. No.: WO2020/255453
PCT Pub. Date: Dec. 24, 2020

(65) Prior Publication Data
US 2022/0227177 A1    Jul. 21, 2022

(30) Foreign Application Priority Data

Jun. 19, 2019    (JP) .................................. 2019-114012

(51) Int. Cl.
*B60C 11/12*    (2006.01)
*B60C 9/00*    (2006.01)
(Continued)

(52) U.S. Cl.
CPC ........ *B60C 11/1218* (2013.01); *B60C 9/0007* (2013.01); *B60C 9/0064* (2013.01);
(Continued)

(58) Field of Classification Search
CPC ............. B60C 11/1218; B60C 11/1236; B60C 11/1259; B60C 9/0007; B60C 9/0064;
(Continued)

(56) References Cited

U.S. PATENT DOCUMENTS 2,302,027 A * 11/1942 Havens ................. B60C 11/042
                                                         152/DIG. 3
5,373,881 A * 12/1994 Enoki .................... B60C 11/047
                                                         152/900
(Continued)

FOREIGN PATENT DOCUMENTS

| CN | 101811421 A | 8/2010 |
| CN | 102596595 A | 7/2012 |

(Continued)

OTHER PUBLICATIONS

International Search Report for PCT/JP2019/048755, dated Mar. 3, 2020.

(Continued)

*Primary Examiner* — Justin R Fischer
*Assistant Examiner* — Philip N Schwartz
(74) *Attorney, Agent, or Firm* — Sughrue Mion, PLLC

(57) ABSTRACT

A pneumatic tire including a belt constituted by at least one belt layer on a tire radial-direction inner side of a tread portion. The belt layer includes a reinforcing element containing plural metal filaments aligned in a single row without being twisted together is embedded in an elastomer. The tread portion includes: two or more circumferential main grooves arranged within a width of a ground-contact surface; and land portions, and widthwise sipes are arranged in at least one of center land portion. The widthwise sipes each include: a linear portion linearly extending from the surface of the tread portion toward the tire radial-direction inner side; and a bent portion extending from the linear portion toward the tire radial-direction inner side, and the length of the linear portion increases from an extending length center portion of each widthwise sipe toward at least one of tread widthwise end portions.

19 Claims, 4 Drawing Sheets

(51) Int. Cl.
  *B60C 9/18* (2006.01)
  *B60C 11/03* (2006.01)
  *B60C 9/20* (2006.01)
  *B60C 11/00* (2006.01)

(52) U.S. Cl.
  CPC ........ *B60C 9/1821* (2013.01); *B60C 11/0304* (2013.01); *B60C 11/1236* (2013.01); *B60C 11/1259* (2013.01); *B60C 2009/2077* (2013.01); *B60C 2009/2083* (2013.01); *B60C 2011/0033* (2013.01)

(58) Field of Classification Search
  CPC .......... B60C 9/1821; B60C 2009/2077; B60C 2009/2083
  See application file for complete search history.

(56) References Cited

U.S. PATENT DOCUMENTS

| | | | |
|---|---|---|---|
| 2001/0054466 A1 | 12/2001 | Morii et al. | |
| 2003/0029537 A1 | 2/2003 | Iwamura | |
| 2012/0234443 A1 | 9/2012 | Kurokawa et al. | |
| 2013/0206302 A1* | 8/2013 | Yasuda ................. | B60C 9/0064 152/451 |
| 2013/0263984 A1* | 10/2013 | Bervas ................. | B60C 11/0306 152/154.2 |
| 2014/0166173 A1 | 6/2014 | Dayet et al. | |
| 2015/0013865 A1 | 1/2015 | Yoshikawa | |
| 2016/0114630 A1* | 4/2016 | Saeki ................. | B60C 11/1218 152/209.18 |
| 2017/0066291 A1 | 3/2017 | Hiraishi | |
| 2017/0113492 A1 | 4/2017 | Kobayashi et al. | |
| 2017/0129288 A1 | 5/2017 | Satoi | |
| 2019/0100059 A1 | 4/2019 | Kaji et al. | |
| 2020/0039295 A1 | 2/2020 | Uemura | |
| 2021/0162816 A1* | 6/2021 | Nakata ................. | B60C 11/1218 |

FOREIGN PATENT DOCUMENTS

| | | | | |
|---|---|---|---|---|
| CN | 105324254 A | | 2/2016 | |
| JP | 4-95506 A | | 3/1992 | |
| JP | H0632115 A | * | 2/1994 | ............ B60C 11/12 |
| JP | 2013-244812 A | | 12/2003 | |
| JP | 2004-314758 A | | 11/2004 | |
| JP | 2008-001195 A | | 1/2008 | |
| JP | 2010-053495 A | | 3/2010 | |
| JP | 2010-111354 A | | 5/2010 | |
| JP | 2010-143377 A | | 7/2010 | |
| JP | 2011-143858 A | | 7/2011 | |
| JP | 2012-076674 A | | 4/2012 | |
| JP | 2012-106570 A | | 6/2012 | |
| JP | 2003-025812 A | | 1/2013 | |
| JP | 2013-132993 A | | 7/2013 | |
| JP | 2013-216271 A | | 10/2013 | |
| JP | 2013-244782 A | | 12/2013 | |
| JP | 2013-244811 A | | 12/2013 | |
| JP | 2015-37924 A | | 2/2015 | |
| JP | 2016-124438 A | | 7/2016 | |
| JP | 2017-193249 A | | 10/2017 | |
| WO | 2018/190308 A1 | | 10/2018 | |
| WO | WO-2019124037 A1 | * | 6/2019 | ......... B60C 11/0304 |

OTHER PUBLICATIONS

Communication dated Mar. 29, 2023 issued by the State Intellectual Property Office of the P.R. China in application No. 201980097270.X.
Communication dated Jun. 7, 2023 issued by the European Patent Office in application No. 19933946.6.

* cited by examiner

PNEUMATIC TIRE

CROSS REFERENCE TO RELATED APPLICATIONS

This application is a National Stage of International Application No. PCT/JP2019/048755 filed Dec. 12, 2019, claiming priority based on Japanese Patent Application No. 2019-114012 filed Jun. 19, 2019.

TECHNICAL FIELD

The present invention relates a pneumatic tire (hereinafter, also simply referred to as "tire"), more particularly a pneumatic tire in which metal monofilaments are used in a belt layer to further improve wear resistance while improving lightweightness and steering stability.

BACKGROUND ART

Generally, inside a tire that requires strength, a carcass that includes reinforcing cords embedded along the meridian direction of a ring-shaped tire main body is arranged, and a belt layer is arranged on the tire radial-direction outer side of the carcass. This belt layer is usually formed using an elastomer-metal cord composite obtained by coating a metal cord such as a steel cord with an elastomer, and imparts the tire with load resistance, traction resistance, and the like.

In recent years, there is an increasing demand for weight reduction of tires for the purpose of improving the fuel efficiency of automobiles. As a means for reducing the tire weight, metal cords for belt reinforcement have been drawing attention, and a large number of technologies for using metal filaments as a belt cord without twisting have been disclosed. For example, Patent Document 1 discloses: a steel cord for tire reinforcement, in which the periphery of a steel cord body composed of a single monofilament is coated with a thermoplastic elastomer composition obtained by dispersing an elastomer in a thermoplastic resin; and a tire including the same. Further, Patent Document 2 discloses a pneumatic radial tire including a steel cord in a belt layer of the tire, in which steel cord two to six main filaments of the same diameter are arranged parallel without being twisted together in such a manner to constitute a single layer as a main filament bundle, and a single straight steel filament of a smaller diameter than the main filaments is wound around the main filament bundle as a wrapping filament.

RELATED ART DOCUMENTS

Patent Documents

[Patent Document 1] JP2010-053495A
[Patent Document 2] JP2012-106570A

SUMMARY OF THE INVENTION

Problems to be Solved by the Invention

When metal monofilaments are used as a reinforcing element of a belt layer, the belt weight is reduced and the in-plane rigidity of the belt layer is increased at the same time, so that the steering stability is improved. However, with regard to the wear resistance required as a tire performance, a further improvement is demanded at present.

Therefore, an object of the present invention is to provide a pneumatic tire in which metal monofilaments are used in a belt layer to further improve wear resistance while improving lightweightness and steering stability.

Means for Solving the Problems

The present inventor intensively studied to solve the above-described problems and obtained the following finding as a result. That is, the present inventor discovered that the above-described problems can be solved by not only using metal monofilaments in a belt layer to improve lightweightness and steering stability but also arranging widthwise sipes having a predetermined structure at predetermined positions of a tread portion, thereby completing the present invention.

That is, the pneumatic tire of the present invention is a pneumatic tire which includes a belt including at least one belt layer on a tire radial-direction inner side of a tread portion, the pneumatic tire being characterized in that:

- the belt includes a belt layer in which a reinforcing element containing plural metal filaments aligned in a single row without being twisted together is embedded in an elastomer;
- the tread portion includes two or more circumferential main grooves arranged within a width of a ground-contact surface, and land portions partitioned by the circumferential main grooves;
- when two land portions on respective tread width-direction outer sides are defined as shoulder land portions while land portions on a tread width-direction inner side than the shoulder land portions are defined as center land portions, a widthwise sipe extending in the tread width direction is arranged in at least one of the center land portions;
- the widthwise sipe includes a linear portion linearly extending from the surface of the tread portion toward the tire radial-direction inner side, and a bent portion extending from a tire radial-direction inner end of the linear portion toward the tire radial-direction inner side while bending in a tire circumferential direction;
- a linear shortest section where the length of the linear portion is the shortest exists in an extending length center portion of the widthwise sipe; and
- the length of the linear portion increases from the linear shortest section toward at least one of tread widthwise end portions.

The "extending length center portion" of the widthwise sipe means a region of 60% in the center of the extending length of the widthwise sipe, and the "tread widthwise end portions" of the widthwise sipe means regions of 20% on the respective ends of the extending length of the widthwise sipe. Further, the term "widthwise" as used in "widthwise sipe" is defined as a direction in a range of ±50° with respect to the tread width direction.

In the tire of the present invention, the above-described reinforcing element is preferably a metal filament bundle including 2 to 20 metal filaments. Further, in the tire of the present invention, a gap w1 between the metal filaments in the metal filament bundle is preferably 0.01 mm to 0.24 mm. Still further, in the tire of the present invention, the metal filaments preferably have a diameter of 0.15 mm to 0.40 mm. Yet still further, in the tire of the present invention, a gap w2 between adjacent metal filament bundles is preferably 0.25 mm to 2.0 mm.

In the tire of the present invention, it is preferred that the bent portion have two or more peaks in the extending length center portion of the widthwise sipe, and that the number of peaks in the tread widthwise end portions be less than the number of the peaks in the extending length center portion. In the tire of the present invention, it is also preferred that an amplitude of the bent portion vary in the extending length center portion of the widthwise sipe such that the amplitude is larger on a bottom side than on an opening side, and that the amplitude be constant in the tread widthwise end portions of the widthwise sipe. Further, in the tire of the present invention, it is preferred that the widthwise sipe be arranged in a plural number along a tread circumferential direction, and that a ratio l/d between a sipe gap l of adjacent widthwise sipes in the tread circumferential direction and a sipe depth d of the widthwise sipes satisfy a relationship represented by the following equation:

$$2 \leq l/d \leq 4.$$

Still further, in the tire of the present invention, it is preferred that, in the center land portions, a ratio Wc/Dc between a width Wc in the tread width direction and a tread gauge Dc satisfy a relationship represented by the following equation:

$$Wc/Dc \geq 3.$$

Yet still further, in the tire of the present invention, it is preferred that, in the shoulder land portions, a ratio Ws/Ds between a width Ws in the tread width direction and a tread gauge Ds satisfy a relationship represented by the following equation:

$$Ws/Ds \geq 5.$$

Yet still further, in the tire of the present invention, it is preferred that the tread gauge Dc of the center land portions and the tread gauge Ds of the shoulder land portions be both 8.5 mm or less.

EFFECTS OF THE INVENTION

According to the present invention, a pneumatic tire in which metal monofilaments are used in a belt layer to further improve wear resistance while improving lightweightness and steering stability can be provided.

BRIEF DESCRIPTION OF THE DRAWINGS

FIGS. 5A and 5B provide drawings illustrating depthwise cross-sectional shapes of widthwise sipes 18a and 18b of the tire according to one preferred embodiment of the present invention, in which FIG. 5A is an extending length center portion and FIG. 5B is a tread widthwise end portion.

MODE FOR CARRYING OUT THE INVENTION

Figure 1:
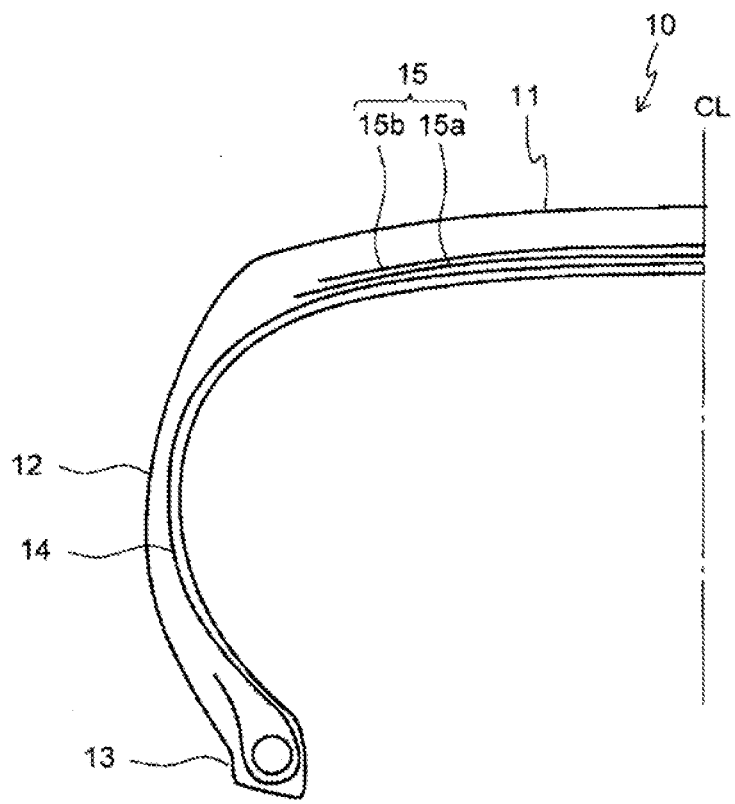
FIG. 1 is a half cross-sectional view illustrating a pneumatic tire according to one preferred embodiment of the present invention.

The pneumatic tire of the present invention will now be described in detail referring to the drawings. FIG. 1 is a schematic half cross-sectional view illustrating a pneumatic tire according to one preferred embodiment of the present invention. An illustrated tire 10 includes: a tread portion 11 which forms a ground-contact portion; a pair of side wall portions 12 which continuously extend inward in the tire radial direction on the respective sides of the tread portion 11; and bead portions 13 which continuously extend on the inner circumferential side of each side wall portion 12.

In the illustrated tire 10, the tread portion 11, the side wall portions 12 and the bead portions 13 are reinforced with a carcass 14 which includes a single carcass layer toroidally extending from one bead portion 13 to the other bead portion 13. In addition, the tread portion 11 is reinforced with a belt 15 which includes at least one belt layer (two belt layers, which are a first belt layer 15a and a second belt layer 15b, in the illustrated example) arranged on the tire radial-direction outer side of the carcass 14 in a crown region. It is noted here that the carcass 14 may be composed of plural carcass layers, and an organic fiber cord extending in a direction substantially perpendicular to the tire circumferential direction, for example, at an angle of 70° to 90°, can be suitably used. In the belt 15, the cord angle can be 30° or smaller with respect to the tire circumferential direction.

First, the belt 15 according to the tire of the present invention will be described. In the tire 10 of the present invention, the belt 15 includes a belt layer (monofilament belt layer; two belt layers 15a and 15b in the illustrated example) in which a reinforcing element containing plural metal filaments aligned in a single row without being twisted together is embedded in an elastomer. By adopting this configuration, the belt layer(s) can be reduced in thickness as compared to a case where a metal cord obtained by twisting metal filaments together is used as the reinforcing element. In the tire 10 of the present invention, all of the belt layers constituting the belt 15 may be monofilament belt layers, or some of the belt layers may be monofilament belt layers. When some of the belt layers are monofilament belt layers, a known reinforcing element such as a metal cord obtained by twisting metal filaments together can be used in other belt layers.

In the tire 10 of the present invention, it is preferred that the metal filaments in the monofilament belt layers be substantially straight metal filaments; however, metal filaments that are two-dimensionally patterned in an undulating shape or a zigzag shape, or metal filaments that are three-dimensionally patterned in a spiral shape may be used as well. The term "straight metal filament" used herein refers to a metal filament that has not been intentionally patterned and thus have no substantial shape.

Figure 2:
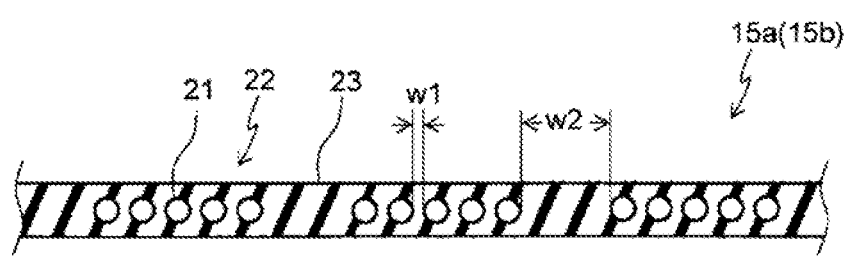
FIG. 2 is a widthwise cross-sectional view illustrating a monofilament belt layer in the pneumatic tire according to one preferred embodiment of the present invention.
Figure 3:
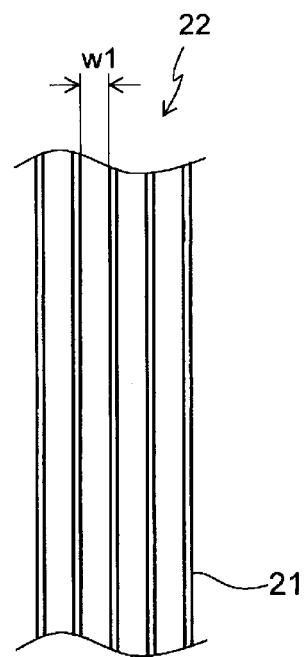
FIG. 3 is a plan view of a metal filament bundle illustrated in FIG. 2.

FIG. 2 is a widthwise cross-sectional view illustrating a monofilament belt layer in the pneumatic tire according to one preferred embodiment of the present invention, and FIG. 3 is a plan view of a metal filament bundle illustrated in FIG. 2. As illustrated in FIGS. 2 and 3, in the tire 10 of the present invention, the reinforcing element is preferably a metal filament bundle 22 which includes 2 to 20 metal filaments 21. The metal filaments 21 constitutes preferably 2 or more, more preferably 5 or more, but preferably 20 or less, more preferably 12 or less, still more preferably 10 or less, particularly preferably 9 or less metal filament bundles 22. In the illustrated example, five metal filaments 21 that are paralleled without being twisted together constitute each metal filament bundle 22. By bundling the metal filaments 21 in this manner, a sufficient distance w2 between metal filament bundles 22 can be ensured; therefore, belt edge separation (BES), which is propagation of rubber peeling between adjacent metal filament bundles 22 that starts at the ends of the metal filament bundles 22 on the belt widthwise edges, can be inhibited while reducing the weight through a reduction in the gauge thickness of the belt 15.

In each metal filament bundle 22, an elastomer 23 hardly infiltrates between adjacent filaments 21 that are in close contact with each other, and this leads to the generation of a non-elastomer-coated region where filaments are not coated with the elastomer 23. Accordingly, when the metal filament bundle 22 obtained by bundling the metal filaments 21 without twisting them together is used as the reinforcing element of the belt 15, the metal filaments 21 in such a non-elastomer-coated region are displaced from each other during tire rolling, as a result of which the in-plane rigidity of the belt 15 is reduced, and steering stability may consequently be impaired. Therefore, in the tire 10 of the present invention, it is preferred to allow the elastomer 23 to sufficiently infiltrate between adjacent metal filaments 21 so as to eliminate the above-described defects and thereby enhance the in-plane rigidity of the belt 15 and improve the steering stability.

In the tire 10 of the present invention, in order to eliminate the presence of a continuous non-elastomer-coated region between adjacent metal filaments 21 in the metal filament bundle 22 so as not only to ensure a corrosion propagation resistance but also to improve the in-plane rigidity of the belt 15 and thereby obtain a good steering stability-improving effect, the elastomer coating ratio of adjacent metal filaments 21 on a widthwise side surface of the metal filament bundle 22 is preferably 10% or higher, more preferably 20% or higher, per unit length. The adjacent metal filaments 21 are in a state of being coated at a ratio of still more preferably 50% or higher, particularly preferably 80% or higher, most preferably 90% or higher.

Accordingly, in the tire 10 of the present invention, a gap w1 between the metal filaments 21 constituting the metal filament bundle 22 is preferably 0.01 mm to smaller than 0.24 mm. By arranging the gap w1 in this range between adjacent metal filaments 21, the elastomer 23 is allowed to sufficiently infiltrate therein, as a result of which the metal filament bundle 22 can undergo out-of-plane deformation when a compressive input is applied thereto, and breakage of the metal filament bundle 22 can thereby be inhibited. By controlling the gap w1 between the metal filaments 21 to be smaller than 0.24 mm, separation between the metal filaments 21 inside the metal filament bundle 22 can be inhibited. Meanwhile, by controlling the gap w1 between the metal filaments 21 to be 0.01 mm or larger, the elastomer 23 is allowed to sufficiently infiltrate between the metal filaments 21 inside the metal filament bundle 22. The gap w1 is preferably 0.03 mm to 0.20 mm, more preferably 0.03 mm to 0.18 mm.

Further, in the tire 10 of the present invention, the metal filaments 21 have a diameter of preferably 0.15 mm to 0.40 mm, more preferably 0.18 mm or larger, still more preferably 0.20 mm or larger, but 0.35 mm or smaller. By controlling the diameter of the metal filaments 21 to be 0.40 mm or smaller, a sufficient effect of reducing the weight of the tire 10 can be obtained. Meanwhile, by controlling the diameter of the metal filaments 21 to be 0.15 mm or larger, a sufficient belt strength can be exerted.

Moreover, in the tire 10 of the present invention, a gap w2 between metal filament bundles 22 is preferably 0.25 mm to 2.0 mm. By controlling the gap w2 between metal filament bundles 22 to be 0.25 mm or larger, BES can be inhibited in a favorable manner. Meanwhile, by controlling the gap w2 between metal filament bundles 22 to be 2.0 mm or smaller, good rigidity of the belt 15 can be maintained. The gap w2 is preferably 0.3 mm to 1.8 mm, more preferably 0.30 mm to 1.5 mm.

The elastomer 23 may be any rubber, and examples of the elastomer 23 include, in addition to conventional rubbers: diene-based rubbers and hydrogenation products thereof, such as natural rubbers (NR), isoprene rubbers (IR), epoxidized natural rubbers, styrene-butadiene rubbers (SBR), butadiene rubbers (BR, high-cis BR and low-cis BR), nitrile rubbers (NBR), hydrogenated NBRs, and hydrogenated SBRs; olefin-based rubbers, such as ethylene-propylene rubbers (EPDM and EPM), maleic acid-modified ethylene-propylene rubbers (M-EPM), butyl rubbers (IIR), copolymers of isobutylene and an aromatic vinyl or diene monomer, acrylic rubbers (ACM), and ionomers; halogen-containing rubbers, such as Br-IIR, Cl-IIR, brominated isobutylene-p-methylstyrene copolymers (Br-IPMS), chloroprene rubbers (CR), hydrin rubbers (CHR), chlorosulfonated polyethylene rubbers (CSM), chlorinated polyethylene rubbers (CM), and maleic acid-modified chlorinated polyethylene rubbers (M-CM); silicone rubbers, such as methyl vinyl silicone rubber, dimethyl silicone rubber, and methylphenyl vinyl silicone rubber; sulfur-containing rubbers, such as polysulfide rubbers; fluororubbers, such as vinylidene fluoride-based rubbers, fluorine-containing vinyl ether-based rubbers, tetrafluoroethylene-propylene-based rubbers, fluorine-containing silicone-based rubbers, and fluorine-containing phosphazene-based rubbers; and thermoplastic elastomers, such as styrene-based elastomers, olefin-based elastomers, ester-based elastomers, urethane-based elastomers, and polyamide-based elastomers.

In the tire 10 of the present invention, the "metal filaments 21" generally refers to wire-like metals that contain steel, namely iron, as a main component (the mass of iron exceeds 50% by mass with respect to a total mass of each metal filament), and the metal filaments 21 may consist of only iron, or may contain a metal other than iron, such as zinc, copper, aluminum, or tin.

In the tire 10 of the present invention, the surface state of the metal filaments 21 is not particularly limited, and the metal filaments 21 may take, for example, the following form. That is, for example, the surface of each metal filament 21 has N atoms in an amount of 2% by atom to 60% by atom, and a Cu/Zn ratio of 1 to 4. Further, in each metal filament 21, for example, the amount of phosphorus contained as an oxide in the filament outermost layer of 5 nm inward in the filament radial direction is 7.0% by atom or less in terms of the ratio with respect to the whole amount excluding the carbon (C) amount.

In the tire 10 of the present invention, the surfaces of the metal filaments 21 may be treated by plating. The type of the plating is not particularly limited, and examples thereof include zinc (Zn) plating, copper (Cu) plating, tin (Sn) plating, brass (copper-zinc (Cu—Zn)) plating, bronze (copper-tin (Cu—Sn)) plating, and ternary plating, such as copper-zinc-tin (Cu—Zn—Sn) plating and copper-zinc-cobalt (Cu—Zn—Co) plating. Thereamong, brass plating and copper-zinc-cobalt plating are preferred since a brass-plated metal filament exhibits excellent adhesion with a rubber. In the brass plating, the ratio of copper and zinc (copper:zinc) is usually 60:40 to 70:30 based on mass, and the copper-zinc-cobalt plating usually contains 60 to 75% by mass of copper and 0.5 to 10% by mass of cobalt. The thickness of the resulting plated layer is generally 100 nm to 300 nm.

Further, in the tire 10 of the present invention, the diameter, the tensile strength, and the cross-sectional shape of the metal filaments 21 are not particularly limited. For example, as the metal filaments 21, metal filaments having a tensile strength of 2,500 MPa (250 kg/mm$^2$) or higher can be used. The widthwise cross-sectional shape of the metal filaments 21 is also not particularly limited and may be, for example, elliptical, rectangular, triangular, or polygonal; however, it is preferably circular. In the tire 10 of the present invention, a wrapping filament (spiral filament) may be used as well when it is necessary to restrain the metal filament bundle 22.

Figure 4:
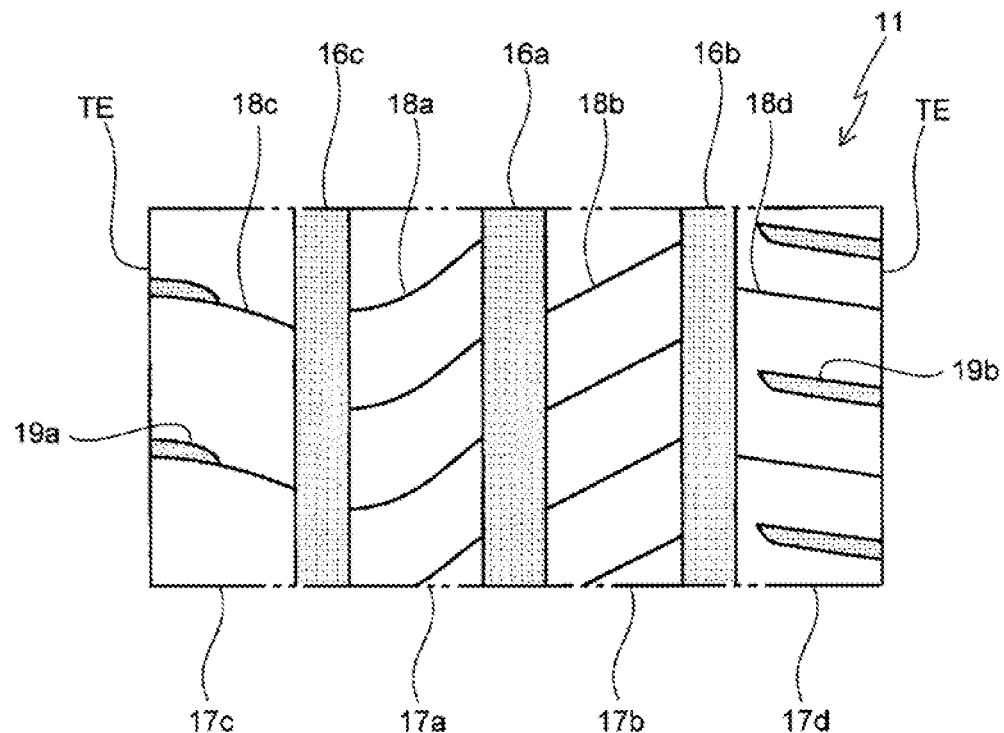
FIG. 4 is a development view illustrating a tread portion of the pneumatic tire according to one preferred embodiment of the present invention.

Next, the tread portion 11 according to the tire 10 of the present invention will be described. FIG. 4 is a development view illustrating a tread portion of the pneumatic tire according to one preferred embodiment of the present invention. As illustrated, the tire 10 of the present invention includes: two or more circumferential main grooves 16 (three circumferential grooves 16a, 16b, and 16c in the illustrated example) which are arranged within a width of a ground-contact surface of the tread portion 11; and land portions 17 (four land portions 17a, 17b, 17c, and 17d in the illustrated example) which are partitioned by the circumferential main grooves 16. When two of the land portions 17 on the respective tread width-direction outer sides are defined as shoulder land portions (shoulder land portions 17c and 17d in the illustrated example) while the land portions 17 on the tread width-direction inner side than the shoulder land portions are defined as center land portions (two center land portions 17a and 17b in the illustrated example), widthwise sipes (widthwise sipes 18a and 18b in the illustrated example), which are so-called three-dimensional sipes (3D sipes) each including a bent portion that extends toward the tire radial-direction inner side while bending in the tire circumferential direction, are arranged in at least one of the center land portions 17a and 17b, preferably all of the center land portions.

Figure 5:
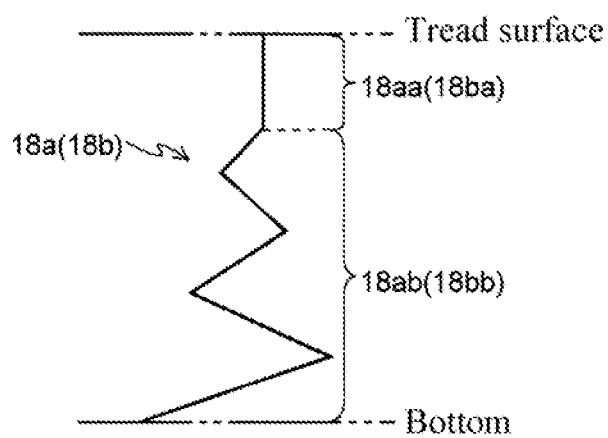
Figure 5:
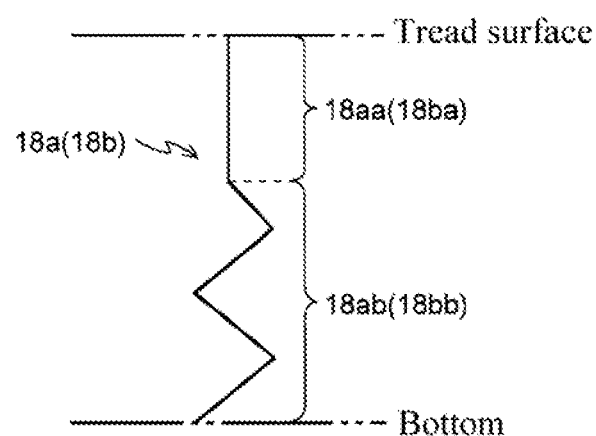

The widthwise sipes 18a and 18b will now be described in more detail. FIGS. 5A and 5B provide drawings illustrating depthwise cross-sectional shapes of the widthwise sipes 18a and 18b of the tire according to one preferred embodiment of the present invention, in which FIG. 5A is an extending length center portion and FIG. 5B is a tread widthwise end portion. As illustrated in FIGS. 5A and 5B, the widthwise sipes 18a and 18b which are 3D sipes arranged in the center land portions 17a and 17b each include: a linear portion 18aa (18ba) which extends from an opening on the surface of the tread portion 11 toward the tire radial-direction inner side; and a bent portion 18ab (18bb) which extends from a tire radial-direction inner end of the linear portion 18ab (18ba) toward the tire radial-direction inner side while bending in the tire circumferential direction.

Further, in the tire 10 of the present invention, a linear shortest section where the length of the linear portion 18ab (18ba) is the shortest exists in the extending length center portion of each widthwise sipe 18a (18b), and the length of the linear portion 18ab (18ba) increases from this linear shortest section toward at least one of the tread widthwise end portions, preferably both of the tread widthwise end portions. For example, the shortest section of the linear portion 18ab (18ba) has a certain width, and the length of the linear portion 18ab (18ba) may gradually increase from one end of this width toward a tread widthwise end portion of the widthwise sipe 18a (18b). Further, in the tread widthwise end portion, the length of the linear portion 18ab (18ba) may be constant. The feature that "a linear shortest section where the length of the linear portion is the shortest exists in the extending length center portion of each widthwise sipe, and the length of the linear portion increases from this linear shortest section toward the tread widthwise end portion(s)" means that the widthwise sipes 18a and 18b do not have any part where their lengths in the depth direction decrease from the linear shortest section toward the respective tread widthwise ends (both ends). The actions and effects of this structure will now be described.

According to the tire 10 of the present invention, in the extending length center portions of the widthwise sipes 18a and 18b where the rubber swelling amount of block pieces partitioned by the widthwise sipes 18a and 18b is increased when a load is applied to the tire, the linear portions 18ab and 18ba have a relatively short length in the depth direction; therefore, the amount of contact between the sipe wall surfaces can be increased, and an effect of the sipe wall surfaces engaging with each other can be enhanced. As a result, the rigidity of the land portions 17a and 17b can be increased, so that the wear resistance of the tire can be improved.

In the tire 10 of the present invention, at a depthwise cross-section, it is preferred that the bent portions 18ab and 18bb of the widthwise sipes 18a and 18b each have two or more peaks in the extending length center portion, and that the number of the peaks in the tread widthwise end portions be less than the number of the peaks in the extending length center portion. The reason for this is because, as a result thereof, the amount of contact between the sipe wall surfaces can be increased and an effect of the sipe wall surfaces engaging with each other can be further enhanced, so that the wear resistance of the tire can be further improved.

The illustrated tire 10 of the present invention includes an extending length center portion that has four peaks and a tread widthwise end portion that has three peaks; however, various modifications can be made as long as the number of the peaks does not increase from the extending length center portion toward the tread widthwise end portion. As one example, the extending length center portion may be further divided into two regions to form a region having, for example, 5 peaks, and a region having, for example, 4 peaks (the region having 5 peaks is a region further on the extending length center side), and the tread widthwise end portion may be further divided into two regions to form a region having, for example, 3 peaks, and a region having, for example, 2 peaks (the region having 3 peaks is a region further on the extending length center side).

In the bent portions 18ab and 18bb of the widthwise sipes 18a and 18b in the tire 10 of the present invention, it is preferred that the amplitude within the extending length center portion vary such that it is larger on the bottom side than on the opening side. The reason for this is because, as a result thereof, the amount of contact between the sipe wall surfaces can be increased and an effect of the sipe wall surfaces engaging with each other can be further enhanced, so that the wear resistance of the tire can be further improved.

In the extending length center portions of the widthwise sipes 18a and 18b in the tire 10 of the present invention, the amplitude gradually increases from the opening side toward the bottom side; however, the amplitude is not limited to this mode as long as it does not decrease from the opening side toward the bottom side. For example, a region having a constant first amplitude may be formed on the opening side, and a region having a constant second amplitude larger than the first amplitude may be formed further on the bottom side. In the tread widthwise end portions of the widthwise sipes 18a and 18b, the amplitude is preferably constant.

In the tire 10 of the present invention, plural widthwise sipes 18a and 18b are arranged along the tread circumferential direction, and a ratio l/d between a sipe gap l of adjacent widthwise sipes 18a and 18b in the tread circumferential direction and a sipe depth d preferably satisfies a relationship represented by the following equation:

$$2 \leq 1/d \leq 4.$$

By controlling the ratio 1/d to be 2 or higher, the rigidity of the block pieces partitioned by the widthwise sipes 18a and 18b can be secured to ensure wear resistance. Meanwhile, by controlling the ratio 1/d to be 4 or lower, the number of the sipes can be secured to ensure the wet performance.

Further, in the tire 10 of the present invention, a ratio Wc/Dc in the center land portions 17a and 17b between a width Wc in the tread width direction and a tread gauge Dc preferably satisfies a relationship represented by the following equation:

$$Wc/Dc \geq 3.$$

This is because, by controlling the ratio Wc/Dc to be 3 or higher, the rigidity of the center land portions 17a and 17b is ensured, so that a further improvement in wear resistance can be ensured.

Moreover, in the tire 10 of the present invention, a ratio Ws/Ds in the shoulder land portions 17c and 17d between a width Ws in the tread width direction and a tread gauge Ds preferably satisfies a relationship represented by the following equation:

$$Ws/Ds \geq 5.$$

This is because, by controlling the ratio Ws/Ds to be 5 or higher, the rigidity of the shoulder land portions 17c and 17d is ensured, so that a further improvement in wear resistance can be ensured.

In the tire 10 of the present invention, the tread gauge Dc of the center land portions 17a and 17b and the tread gauge Ds of the shoulder land portions 17c and 17d are both preferably 8.5 mm or less, more preferably 6.0 mm or less. This is because, by controlling the Dc and the Ds in this range, the rigidity of the center land portions 17a and 17b as well as the rigidity of the shoulder land portions 17c and 17d are ensured, so that wear resistance can be further improved.

In the tread portion 11 of the tire 10 of the present invention, the above-described 3D sipes only need to be arranged in at least one of the center land portions; however, for example, as illustrated, the 3D sipes may be arranged in all of the center land portions, and the widthwise sipes 18c and 18d of the shoulder land portions 17c and 17d may also be 3D sipes having the above-described structure. In addition, in the center land portions and the shoulder land portions, linear sipes that are different from the 3D sipes having the above-described structure and have no bent portion in the depth direction may be arranged as well. Further, these 3D sipes having the above-described structure and sipes that are linear in the depth direction may be arranged in plural numbers at predetermined pitch intervals along the tread circumferential direction.

In the tire 10 of the present invention, the width of the circumferential main grooves 16 is not particularly limited, and may be 5 to 20 mm. Further the depth (maximum depth) of the circumferential main grooves 16 is preferably 6.5 mm or less, more preferably 6.0 mm or less. The reason for these is because the rigidity of the land portions 17 is thereby ensured, so that wear resistance can be further improved. In consideration of the drainage performance, the depth (maximum depth) of the circumferential main grooves 16 is preferably 5.5 mm or greater.

As illustrated in FIG. 4, in a plan view of the tread portion 11, the widthwise sipes 18a arranged in the center land portion 17a each include: a curved portion which extends in a curved manner from the circumferential main groove 16c positioned in a half section on one side of the tread width direction toward the tread width-direction inner side; and a linear portion which is connected to this curved portion, linearly extends inclined with respect to the tread width direction, and is connected to the circumferential main groove 16a extending on the tire equatorial plane CL. However, the tire 10 of the present invention is not limited to this configuration. The linear portion may be inclined at an angle of, but not particularly limited to, 15° to 50° with respect to the tread width direction.

Further, as illustrated in FIG. 4, in the center land portion 17b, plural widthwise sipes 18b may be arranged at a predetermined pitch interval (in the example illustrated in FIG. 4, at substantially the same pitch interval as the widthwise sipes 18a) along the tread circumferential direction. In the illustrated example, the widthwise sipes 18b linearly extend inclined with respect to the tread width direction; however, the tire 10 of the present invention is not limited to this configuration. The widthwise sipes 18b may be inclined at an angle of, but not particularly limited to, 15° to 50° with respect to the tread width direction.

Moreover, as illustrated in FIG. 4, in the shoulder land portion 17c, a widthwise groove 19a which extends inclined with respect to the tread width direction from a tread edge TE toward the tread width-direction inner side and terminates within the shoulder land portion 17c may be arranged. In addition, the shoulder land portion 17c includes a widthwise sipe 18c which is in communication with the circumferential main groove 16c and extends inclined with respect to the tread width direction from the end of the widthwise groove 19a toward the tread width-direction inner side. The widthwise groove 19a and the widthwise sipe 18c may each be arranged in a plural number at a predetermined pitch interval (in the illustrated example, at a pitch interval twice as large as that of the widthwise sipes 18a) along the tread circumferential direction. These widthwise grooves 19a and widthwise sipes 18c may be inclined at an angle of, but not particularly limited to, 0° to 20° with respect to the tread width direction. The width of the widthwise grooves 19a is not particularly limited and may be, for example, 1 to 4 mm, and the depth (maximum depth) of the widthwise grooves 19a is also not particularly limited and may be, for example, 3 to 5 mm.

As illustrated in FIG. 4, the widthwise grooves 19a terminate within the shoulder land portion 17c without communicating with the circumferential main groove 16c, and the pitch interval along the tread circumferential direction is set larger than in the pitch interval in the center land portions 17a and 17b where only the widthwise sipes 18a and 18b are arranged, whereby the rigidity of the shoulder land portion 17c is ensured and a difference in rigidity between the shoulder land portion 17c and the center land portions 17a and 17b having no widthwise groove is reduced, so that wear resistance and uneven wear resistance are ensured.

Further, as illustrated in FIG. 4, the shoulder land portion 17d includes a widthwise groove 19b which extends inclined with respect to the tread width direction from the tread edge TE toward the tread width-direction inner side and terminates within the shoulder land portion 17d. In addition, in the illustrated example, the shoulder land portion 17d includes a widthwise sipe 18d which is in communication with the circumferential main groove 16b and extends inclined with respect to the tread width direction from the tread edge TE toward the tread width-direction inner side. The widthwise groove 19b and the widthwise sipe 18d are arranged in plural numbers alternately to each other in the tread circumferential direction at a predetermined pitch interval (in the illustrated example, at substantially the same pitch interval as the widthwise sipes 18a). By this, a balance of the rigidity in the shoulder land portion 17d can be ensured. These widthwise grooves 19b and the widthwise sipes 18d may be inclined at an angle of 0° to 20° with respect to the tread width direction. The width of the widthwise grooves 19b is not particularly limited and may be, for example, 1 to 4 mm, and the depth (maximum depth) of the widthwise grooves 19b is also not particularly limited and may be, for example, 3 to 5 mm.

As illustrated in FIG. 4, the widthwise grooves 19b terminate within the land portion 17d without communicating with the circumferential main groove 16b, and the widthwise grooves 19b and the widthwise sipes 18d are arranged alternately along the tread circumferential direction, whereby the rigidity of the shoulder land portion 17d is ensured and a difference in rigidity between the shoulder land portion 17d and the center land portions 17a and 17b having no widthwise groove 19b is reduced, so that wear resistance and uneven wear resistance are ensured.

For example, the linear portions 18ab and 18ba of the widthwise sipes 18a and 18b may have an increasing length along the depth direction from each extending length center portion toward both of the tread widthwise end portions; however, the length of the widthwise sipes 18a and 18b in the depth direction may increase from the respective extending length center portions of the widthwise sipes 18a and 18b to only either one of the tread widthwise end portions. Further, with regard to the tread portion 11, for example, the widthwise sipes 18a and 18b extend across the land portions 17a and 17b, respectively; however, the widthwise sipes 18a and 18b may terminate inside the land portions 17a and 17b, respectively. The widthwise sipes 18a and 18b may extend in various shapes, such as a linear shape, a curved shape, and a zigzag shape, along the tread width direction.

The tire of the present invention has been described thus far, and the tire 10 of the present invention is not particularly limited, except for the structure of the belt 15 and the structure of the tread portion 11. For example, a belt reinforcing layer may be arranged on the tire radial-direction outer side of the belt 15, and another reinforcing member may be used as well. As a gas filled into the tire 10 of the present invention, normal air or an air having an adjusted oxygen partial pressure, as well as an inert gas such as nitrogen, argon or helium, can be used. The tire 10 of the present invention can be suitably used as a tire of a passenger vehicle, or a tire of a truck or a bus.

EXAMPLES

The present invention will now be described in more detail by way of Examples thereof.

Examples and Comparative Example

Reinforcing elements having a structure conforming to the respective conditions shown in Table 1 below were prepared using steel filaments. The thus obtained reinforcing elements were each coated from both above and below with a rubber-made sheet of about 0.5 mm in thickness, and the resultants were vulcanized at 160° C. for 20 minutes to produce rubber-steel cord composites to be used in belt layers. A coating rubber was prepared by blending and kneading in accordance with a conventional method.

<Belt In-Plane Rigidity>

Using intersecting belt layer samples that were prepared from each of the above-obtained rubber-steel cord composites, the in-plane rigidity was evaluated as an index of steering stability. The belt angle was set at ±28° with respect to the tire circumferential direction. A jig was set on each of two spots underneath and one spot on top of each intersecting belt layer sample, and a load applied to the sample when the jig was pressed at one spot on top was evaluated as the in-plane rigidity. The results thereof are shown together in Table 1 in terms of index values, taking the value of Comparative Example as 100. It is noted here that the evaluation of the belt in-plane rigidity serves as an indicator relating to steering stability.

<Wear Resistance>

Tires of the type illustrated in FIG. 1 (size: 205/55R16) were produced using the respective rubber-steel cord composites as intersecting belt layers, and the wear resistance was evaluated in accordance with the below-described procedure. The belt angle was ±28° with respect to the tire circumferential direction. The tread portion 11 had the same configuration as illustrated in the development view of FIG. 4, and sipes having the structure shown in Table 1 were arranged in all of the land portions. The conditions of the sipes are as shown in Table 1.

The thus obtained tires were each mounted on a rim, inflated to a predetermined internal pressure and then fitted to a vehicle, and the wear resistance was estimated when the vehicle was driven in various driving modes on an ordinary road having a dry surface. The symbols "x" and "○" in Table 1 indicate the followings.

x: The sipes cause a reduction in the shear rigidity of the land portions, and the wear resistance is reduced.

○: An improvement in the in-plane rigidity by monofilament structure formation and an improvement in the shear rigidity of the land portions by three-dimensional sipes are likely to occur, and the wear resistance of the tire is expected to be improved.

TABLE 1

| | | | Comparative Example | Example 1 | Example 2 | Example 3 |
|---|---|---|---|---|---|---|
| Sipe | Sipe width (mm) | | 0.4 | 0.3 | 0.3 | 0.3 |
| | Sipe depth (mm) | | 3.9 | 5.5 | 5.5 | 5.5 |
| | Extending length center portion | Length of linear portion (mm) | 1.5 | 1.5 | 1.5 | 1.5 |
| | | Number of peaks (count) | 3 | 5 | 5 | 5 |
| | | Amplitude | constant | gradually | gradually | gradually |

TABLE 1-continued

|  |  |  | Comparative Example | Example 1 | Example 2 | Example 3 |
|---|---|---|---|---|---|---|
|  |  | of bent portion |  | increasing toward the groove bottom side | increasing toward the groove bottom side | increasing toward the groove bottom side |
|  | Tread widthwise end portion | Length of linear portion (mm) | 1.5 | 2 | 2 | 2 |
|  |  | Number of peaks (count) | 3 | 3 | 3 | 3 |
|  |  | Amplitude of bent portion | constant | constant | constant | constant |
| Belt layer | Reinforcing element structure |  | 2 + 3 | 0.3 mm × 3 | 0.26 mm × 5 | 0.24 mm × 7 |
|  | Gap w1 (mm) |  | — | 0.15 | 0.15 | 0.1 |
|  | Gap w2 (mm) |  | 0.47 to 0.91 | 0.64 | 0.48 | 0.66 |
|  | End count (/50 mm) |  | 37.88 | 27.24 | 21.00 | 16.98 |
| Evaluation | Belt in-plane rigidity |  | 100 | 119 | 105 | 119 |
|  | Wear resistance |  | x | ○ | ○ | ○ |

From Table 1, it is seen that the present invention can further improve wear resistance while improving lightweightness and steering stability.

DESCRIPTION OF SYMBOLS

10: pneumatic tire (tire)
11: tread portion
12: side wall portion
13: bead portion
14: carcass
15: belt
15a, 15b: belt layer
16: circumferential main groove
17: land portion
18: widthwise sipe
19: widthwise groove
21: metal filament
22: metal filament bundle
23: elastomer

The invention claimed is:

1. A pneumatic tire, comprising a belt comprising at least one belt layer on a tire radial-direction inner side of a tread portion,
wherein
the belt comprises a belt layer in which a reinforcing element comprising plural metal filaments aligned in a single row without being twisted together is embedded in an elastomer,
the tread portion comprises: two or more circumferential main grooves arranged within a width of a ground-contact surface; and land portions partitioned by the circumferential main grooves,
when two land portions on respective tread width-direction outer sides are defined as shoulder land portions while land portions on a tread width-direction inner side than the shoulder land portions are defined as center land portions, a widthwise sipe extending in the tread width direction is arranged in at least one of the center land portions,
the widthwise sipe comprises: a linear portion linearly extending from the surface of the tread portion toward the tire radial-direction inner side; and a bent portion extending from a tire radial-direction inner end of the linear portion toward the tire radial-direction inner side while bending in a tire circumferential direction,
a linear shortest section where the length of the linear portion is the shortest exists in an extending length center portion of the widthwise sipe,
the length of the linear portion increases from the linear shortest section toward at least one of tread widthwise end portions;
an amplitude of the bent portion varies in the extending length center portion of the widthwise sipe such that the amplitude is larger on a bottom side than on an opening side, and
the amplitude is constant in the tread widthwise end portions of the widthwise sipe.

2. The pneumatic tire according to claim 1, wherein the reinforcing element is a metal filament bundle comprising 2 to 20 metal filaments.

3. The pneumatic tire according to claim 2, wherein a gap w1 between the metal filaments in the metal filament bundle is 0.01 mm to 0.24 mm.

4. The pneumatic tire according to claim 1, wherein the metal filaments have a diameter of 0.15 mm to 0.40 mm.

5. The pneumatic tire according to claim 1, wherein a gap w2 between adjacent metal filament bundles is 0.25 mm to 2.0 mm.

6. The pneumatic tire according to claim 1, wherein
the bent portion has two or more peaks in the extending length center portion of the widthwise sipe, and
the number of peaks in the tread widthwise end portions is less than the number of the peaks in the extending length center portion.

7. The pneumatic tire according to claim 1, wherein
the widthwise sipe is arranged in a plural number along a tread circumferential direction, and
a ratio l/d between a sipe gap l of adjacent widthwise sipes in the tread circumferential direction and a sipe depth d of the widthwise sipes satisfies a relationship represented by the following equation:

$$2 \leq l/d \leq 4.$$

8. The pneumatic tire according to claim 1, wherein, in the center land portions, a ratio Wc/Dc between a width Wc in the tread width direction and a tread gauge Dc satisfies a relationship represented by the following equation:

$$Wc/Dc \geq 3.$$

9. The pneumatic tire according to claim 1, wherein, in the shoulder land portions, a ratio Ws/Ds between a width Ws in the tread width direction and a tread gauge Ds satisfies a relationship represented by the following equation:

$$Ws/Ds \geq 5.$$

10. The pneumatic tire according to claim 1, wherein the tread gauge Dc of the center land portions and the tread gauge Ds of the shoulder land portions are both 8.5 mm or less.

11. The pneumatic tire according to claim 2, wherein the metal filaments have a diameter of 0.15 mm to 0.40 mm.

12. The pneumatic tire according to claim 3, wherein the metal filaments have a diameter of 0.15 mm to 0.40 mm.

13. The pneumatic tire according to claim 2, wherein a gap w2 between adjacent metal filament bundles is 0.25 mm to 2.0 mm.

14. The pneumatic tire according to claim 3, wherein a gap w2 between adjacent metal filament bundles is 0.25 mm to 2.0 mm.

15. The pneumatic tire according to claim 4, wherein a gap w2 between adjacent metal filament bundles is 0.25 mm to 2.0 mm.

16. The pneumatic tire according to claim 2, wherein
the bent portion has two or more peaks in the extending length center portion of the widthwise sipe, and
the number of peaks in the tread widthwise end portions is less than the number of the peaks in the extending length center portion.

17. The pneumatic tire according to claim 3, wherein
the bent portion has two or more peaks in the extending length center portion of the widthwise sipe, and
the number of peaks in the tread widthwise end portions is less than the number of the peaks in the extending length center portion.

18. The pneumatic tire according to claim 4, wherein
the bent portion has two or more peaks in the extending length center portion of the widthwise sipe, and
the number of peaks in the tread widthwise end portions is less than the number of the peaks in the extending length center portion.

19. The pneumatic tire according to claim 5, wherein
the bent portion has two or more peaks in the extending length center portion of the widthwise sipe, and
the number of peaks in the tread widthwise end portions is less than the number of the peaks in the extending length center portion.

* * * * *